Nov. 3, 1931.  P. NACHTSHEIM  1,830,711
SWINGING JOINT
Filed Feb. 12, 1930
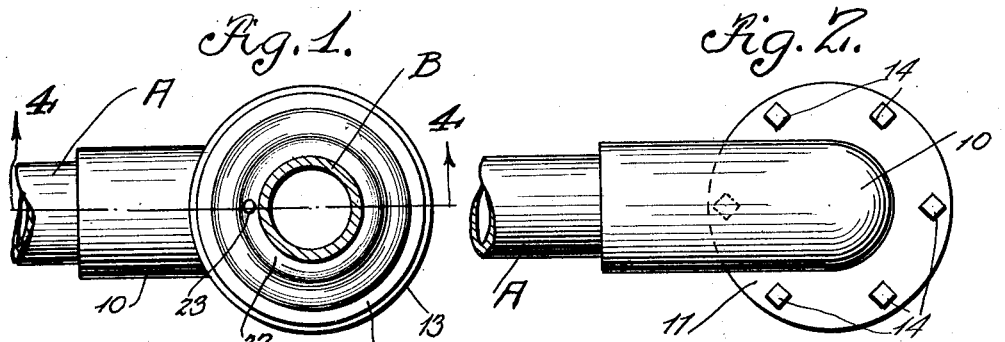
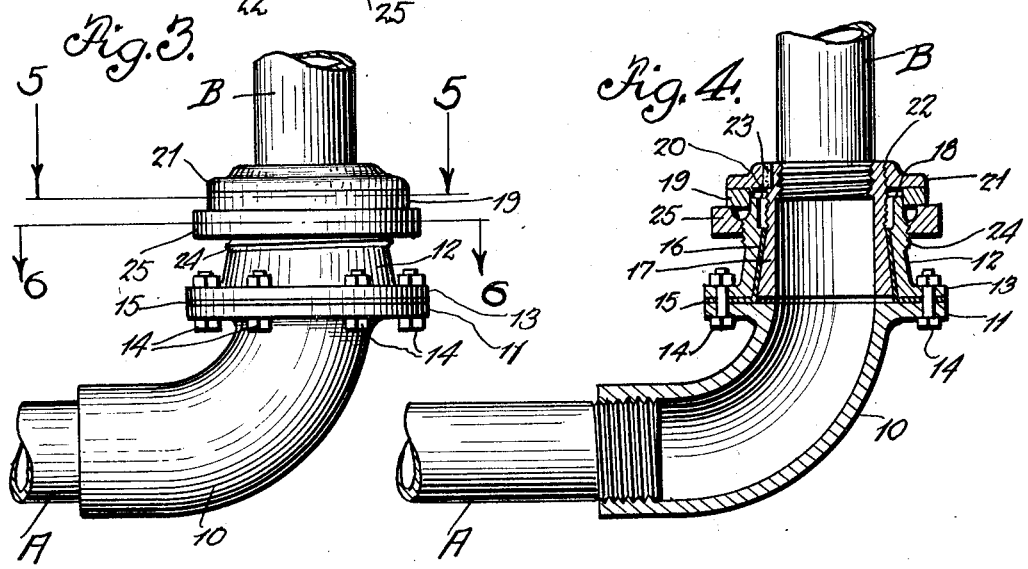
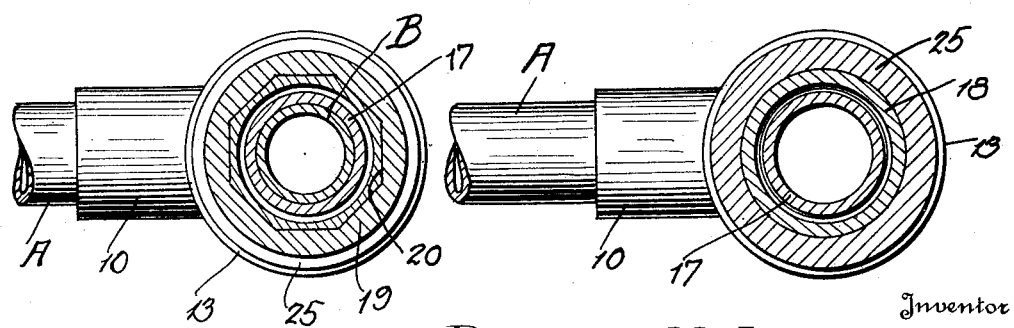
Inventor
Peter Nachtsheim
By Sinton, Kellogg Smith
Attorneys Patented Nov. 3, 1931

1,830,711

UNITED STATES PATENT OFFICE

PETER NACHTSHEIM, OF NEW YORK, N. Y.

SWINGING JOINT

Application filed February 12, 1930. Serial No. 427,885.

The invention relates to a joint construction, and more especially to a swing joint adaptable in loading oil, water or other liquids from tanks or similar containers into any other movable container, such as tank trucks, or in loading them from pipe lines into tank cars.

The primary object of the invention is the provision of a joint of this character, wherein the construction is of novel form, so that it can be maintained tight under all conditions, to avoid possibility of seepage or leakage through the joint, as in loading oil, water or other liquids from tanks or similar containers into any other movable container, or in loading them from pipe lines into tank cars, it is necessary to have flexible connections that, at the same time, should be tight. Also a joint of the character named is sometimes necessary to convey steam, compressed air or other fluids without leakage.

Another object of the invention is the provision of a joint of this character, wherein the same can be adjusted to the required degree to assure against leakage, without retarding the flexibility of such joint, the adjustment of the joint being effected in a novel manner and with dispatch.

A further object of the invention is the provision of a joint of this character, wherein the adjusting means for tightening the said joint is capable of actuation without requiring the separation of the joint or any partial disassemblage of its parts, the joint being made up of but few parts, so that it can be readily and easily assembled and disassembled should the occasion require.

A still further object of the invention is the provision of a joint of this character, which is extremely simple in construction, thoroughly reliable and efficient in purpose, strong, durable, and inexpensive to manufacture and install.

With the above and other objects in view the invention consists in the features of construction, combination and arrangement of parts as will be hereinafter more fully described in detail, illustrated in the accompanying drawings, which show the preferred embodiment of the invention, and pointed out in the claims hereunto appended.

In the accompanying drawings:

Figure 1 is a plan view of the joint, the discharge pipe being shown in section.

Figure 2 is a view similar to Figure 1, looking toward the underside of the joint.

Figure 3 is a side elevation of the joint.

Figure 4 is a sectional view taken approximately on the line 4—4 of Figure 1.

Figure 5 is a sectional view taken on the line 5—5 of Figure 3.

Figure 6 is a similar view taken on the line 6—6 of Figure 3.

Similar reference characters indicate corresponding parts throughout the several views in the drawings.

Referring to the drawings in detail, A, designates generally a portion of one section of a delivery pipe, and B, the other section thereof, these being connected through the medium of a swinging joint hereinafter fully described.

The swinging joint comprises a nipple 10, in this instance of arcuate form and has one end threaded onto the pipe section A, while the other end is externally flanged at 11, for the mounting thereon of a joint shell or casing 12, the latter being flanged at 13, correspondingly to the flange 11, and these flanges are united by fasteners 14, it being understood of course that a gasket 15, is interposed between said flanges to render their connection fluid-tight or a ground joint may be used also.

The shell or casing 12, is formed with a tapered bore 16, opening through the ends thereof, and into this bore is fitted a joint union sleeve 17, the same being correspondingly tapered to the bore and may be termed the male member of the joint, while the shell or casing 12, is the female member of the same. This sleeve 17, is threaded onto the pipe section B, or otherwise fastened thereto.

The smaller end of the shell or casing 12, for a distance externally is multi-sided at 18, and loosely engaged about this portion is a washer 19, the center opening 20, therein being correspondingly shaped to the portion 18, and bearing against one side of this washer 19, is an adjustable abutment ring 21, the same being threaded at 22, on the inner end of the sleeve 17, and splined thereto by a key 23, to lock the same together, as will be apparent.

Formed on the shell or casing 12, inwardly of the portion 18, are screw threads 24, having tapped therewith an adjustable collar 25, the latter working against the other side of the washer 19, so that on turning said collar in one direction it will cause an outward thrust on the sleeve 17, to tighten it in the bore 16, in the shell or casing 12, to render the joint formed by the male and female members fluid-tight, as will be obvious.

The gasket 15, fitted between the shell or casing 12, and the sleeve 17, may be used or omitted, depending on the commodity handled through this swinging joint.

It will be seen that on turning the collar 25, such movement will be interrupted for transmission to the ring 21, by the interpositioning of the washer 19, therebetween. The engagement of the washer 19, with the portion 18, of the shell or casing 12, prevents the turning of said washer 19, upon the latter.

There is no packing required in the swinging joint to render it fluid-tight, as under the adjustment hereinbefore described said joint can be maintained against leakage and at all times rendered tight.

Either pipe section A or B, can be readily and easily turned without damage to the joint and for the purposes herein set forth.

The collar 25, may be turned by hand or by a pipe wrench, wheel handle, T handle, lever handle or any other kindred device for turning it.

The joint as shown illustrates a single joint, repeating it on nipple 10, where pipe section A, joins, constitutes a double swing joint. The nipple 10, may also be altered to extend axially with pipe section B, so as to get a straight swing joint, if found desirable.

What is claimed is:

1. A joint of the character described, comprising interfitted wedging male and female members forming a turning connection fluid passage, coacting means externally engaged on the male and female members and one capable of adjustment to effect thrust to the male member for tightening of the same in the female member, and non-rotatable means on the female member and interpositioned between the last named means to eliminate movement on adjustment of the one means being imparted to the other means.

2. A joint of the character described, comprising interfitting wedging male and female members forming a turning connection fluid passage, coacting means externally engaged on the male and female members and one capable of adjustment to effect thrust of the male member for tightening of the same in the female member and interpositioned between the last named means to eliminate movement on adjustment of the one means being imparted to the other means, and a gasket interposed between the male and female members.

3. A joint of the character described, comprising a shell having a tapered bore, a passage sleeve fitted in the bore and correspondingly tapered to the same, a ring locked on the sleeve, a washer slidably connected to the shell and bearing against the ring, and an adjusting collar carried by the shell and working against the washer to impart thrust to the sleeve for tightening it in the shell.

4. A swinging joint comprising a casing having a tapered bore therein, a sleeve correspondingly tapered to the bore of the casing and rotatably fitted therein, the upper end of said sleeve projecting beyond said casing, a ring secured to the upper projecting end of said sleeve, a collar adjustably mounted upon said casing, a non-rotatable washer slidably mounted upon said casing and interposed between said collar and ring, whereby with adjustment of said collar the fitted connection between said sleeve and the bore of the casing may be regulated.

5. A swinging joint comprising a casing formed with a tapered bore opening through the ends thereof, a pipe connection secured to one end of said casing, a sleeve having its exterior correspondingly tapered to the bore of the casing and rotatably fitted therein, a pipe connection extending from one end of said sleeve, a washer slidably mounted but retained against rotation upon the opposite end of said casing to which the pipe connection is secured, a collar adjustably mounted upon said casing and adapted to work against one side of said washer whereby with adjustment of said collar said ring may be caused to slide upon said casing, an abutment ring adjustably secured to said sleeve and bearing against the opposite side of said washer whereby with adjustment of said collar a thrust may be imparted to said sleeve for tightening it within the casing.

In witness whereof I have hereunto set my hand.

PETER NACHTSHEIM.